US012716906B2

(12) United States Patent
Hsu et al.

(10) Patent No.: US 12,716,906 B2
(45) Date of Patent: Aug. 25, 2026

(54) AUTOMATIC ANALYZER, DISPENSING DEVICE, AND DISPENSING CONTROL METHOD

(71) Applicant: Hitachi High-Tech Corporation, Tokyo (JP)

(72) Inventors: Ruochi Hsu, Tokyo (JP); Nobuhiro Tsukada, Tokyo (JP); Kazuhiro Noda, Tokyo (JP); Shinya Matsuoka, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 859 days.

(21) Appl. No.: 17/915,957

(22) PCT Filed: Jan. 15, 2021

(86) PCT No.: PCT/JP2021/001260
§ 371 (c)(1),
(2) Date: Sep. 29, 2022

(87) PCT Pub. No.: WO2021/215060
PCT Pub. Date: Oct. 28, 2021

(65) Prior Publication Data

US 2023/0184801 A1 Jun. 15, 2023

(30) Foreign Application Priority Data

Apr. 24, 2020 (JP) ................................ 2020-077259

(51) Int. Cl.
*G01N 35/10* (2006.01)

(52) U.S. Cl.
CPC ..... *G01N 35/1009* (2013.01); *G01N 35/1002* (2013.01)

(58) Field of Classification Search
None
See application file for complete search history.

(56) References Cited

U.S. PATENT DOCUMENTS 6,250,130 B1 * 6/2001 Howard ................ G01F 1/7086 73/1.16
6,579,497 B2 6/2003 Woodward
2012/0017704 A1 * 1/2012 Kirste ..................... B01L 3/021 73/864.01

FOREIGN PATENT DOCUMENTS

EP 1978367 A1 10/2008
JP 5-99933 A 4/1993

(Continued)

OTHER PUBLICATIONS

Chinese Office Action issued on Jun. 20, 2025 for Chinese Patent Application No. 202180024259.8.

(Continued)

*Primary Examiner* — P. Kathryn Wright
(74) *Attorney, Agent, or Firm* — Volpe Koenig

(57) ABSTRACT

An automatic analyzer, a dispenser, and associated control methods are provided for suppressing splitting of an air layer in a passage and improving dispensing accuracy. The analyzer includes a nozzle, a pressure source coupled to the nozzle via a passage, and a controller that controls aspiration or discharge of a fluid. During either aspiration or discharge, the controller calculates a position of a gas-liquid phase boundary in the passage based on a volume of an aspired air layer, a cross-sectional area of the passage, and an integrated flow rate of the fluid. The controller then controls flow velocity based on the calculated position and on an orientation in which the gas-liquid phase boundary moves so that the flow velocity remains at or below a critical flow velocity at which air-layer splitting is suppressed, or so that the gas-liquid phase boundary does not pass a cross-sectional change in the passage.

10 Claims, 8 Drawing Sheets

(56) References Cited

FOREIGN PATENT DOCUMENTS

| | | | | |
|---|---|---|---|---|
| JP | 10-123026 A | | 5/1998 |
| JP | 3410306 B2 | | 5/2003 |
| JP | 2004020320 A | * | 1/2004 |
| JP | 2007139738 A | * | 6/2007 |
| JP | 2009-162536 A | | 7/2009 |

OTHER PUBLICATIONS

Extended European Search Report issued on Apr. 18, 2024 for European Patent Application No. 21791737.6.

* cited by examiner 101
102
103
104
111
112
113
114
115
116
117
120
121
122
123
124
125
126
127
128
129
131
132

FIG.3A

ASPIRATION

21

31

CRITICAL VELOCITY SMALL

DISCHARGE

21

33

CRITICAL VELOCITY LARGE

22

34

23

PIPING
AIR
LIQUID

LIQUID MEMBRANE

LIQUID PLUG

CRITICAL VELOCITY
TIME
(1)
(2)
(3)
(4)
(5)

CRITICAL VELOCITY
TIME
(6)
(7)
(8)
(9)
(10)

(1)
(2)
(3)
(4)
(5)
21
24
31
22
32
23
(6)
(7)
(8)
(9)
(10)

ASPIRATION
CRITICAL VELOCITY
VS2
VS1
TIME
31
32
24
VS2
VS1

DISCHARGE
CRITICAL VELOCITY
VD2
VD1
TIME
33
34
24
VD2
VD1

BEFORE DISCHARGE

AFTER DISCHARGE

AUTOMATIC ANALYZER, DISPENSING DEVICE, AND DISPENSING CONTROL METHOD

TECHNICAL FIELD

The present invention relates to an automatic analyzer, a dispenser, and a dispensing control method, and particularly to ones having the passage of a fluid. For example, the present invention relates to ones that control the flow rate a syringe, suppress the splitting of bubbles, and improves dispensing accuracy.

BACKGROUND ART

When a liquid sample derived from a living body such as blood and urine is highly sensitively analyzed, a technique that selectively identifies a component, which is a measurement target, from a sample including a large amount of coexisting substances is useful. In order to accurately calculate the concentration of a specific component in a biological sample, it is important to dispense the biological sample at a predetermined concentration at a predetermined amount into a reaction vessel.

Conventionally, in an automatic analyzer, in the case in which a sample or a reagent is dispensed, a piping is filled with a liquid to be aspirated and discharged (e.g. water, in the following, referred to as "a push out fluid", which is not limited to water), a nozzle is connected using this piping, and a dispenser is formed using this nozzle and a dispensing pump. Using this dispenser, air and a predetermined amount of a liquid sample are in turn aspirated, and a predetermined amount of the liquid sample is discharged to a reaction vessel.

As described above, in the automatic analyzer, in order to prevent the dilution or carry-over of the sample when the inside of the piping is filled with the push out fluid and the sample is dispensed, an air layer is formed.

Patent Literature 1 discloses a dispensing method in which "an air gap passes a tapered part, a sample reaches a safe region where the splitting of the gap does not occur, and then the aspiration speed is switched to the high-speed side."

CITATION LIST

Patent Literature

Patent Literature 1: Japanese Unexamined Patent Application Publication No. Hei10 (1998)-123026

Patent Literature 2: Japanese Unexamined Patent Application Publication No. Hei5 (1993)-99933

Patent Literature 3: Japanese Unexamined Patent Application Publication No. 2009-162536

SUMMARY OF INVENTION

Technical Problem

However, the conventional technique has a problem arises in that depending on the physical properties of a liquid that has to be dispensed, the air layer in the inside of the piping might be split to influence dispensing accuracy in aspiration or discharge of the liquid.

An object of the present invention is to provide an automatic analyzer, a dispenser, and a dispensing control method that suppress the splitting of an air layer and obtain high dispensing accuracy. This object is achieved, for example, a flow velocity is controlled corresponding to the position and moving direction of a gas-liquid phase boundary in the inside of a piping.

Solution to Problem

An example of an automatic analyzer according to the present invention includes a nozzle configured to dispense a fluid; a pressure source configured to generate a pressure fluctuation that controls a flow velocity of aspiration or discharge of the fluid in the nozzle; a passage configured to connect the nozzle to the pressure source; and a controller configured to control operations of the nozzle and the pressure source. In the automatic analyzer, the controller calculates a position of a gas-liquid phase boundary in the passage, and the controller controls the flow velocity based on the position of the gas-liquid phase boundary and an orientation of the gas-liquid phase boundary that moves.

Moreover, an example of an automatic analyzer according to the present invention includes a nozzle configured to dispense a fluid; a pressure source configured to generate a pressure fluctuation that controls a flow velocity of aspiration or discharge of the fluid in the nozzle; a passage configured to connect the nozzle to the pressure source; and a controller configured to control operations of the nozzle and the pressure source. In the automatic analyzer, the controller calculates a position of a gas-liquid phase boundary in the passage, and the controller controls aspiration or discharge of the fluid such that the gas-liquid phase boundary does not pass a position where a cross sectional area of the passage is changed.

An example of a dispenser according to the present invention includes a nozzle configured to dispense a fluid;

a pressure source configured to generate a pressure fluctuation that controls a flow velocity of aspiration or discharge of the fluid in the nozzle; a passage configured to connect the nozzle to the pressure source; and a controller configured to control operations of the nozzle and the pressure source. In the dispenser, the controller calculates a position of a gas-liquid phase boundary in the passage, and the controller controls the flow velocity based on the position of the gas-liquid phase boundary and an orientation of the gas-liquid phase boundary that moves.

An example of a dispensing control method according to the present invention is a dispensing control method for controlling dispensing of a fluid in an automatic analyzer including a passage of the fluid, the method comprising the steps of: calculating a position of a gas-liquid phase boundary in the passage; and controlling a flow velocity on aspiration or discharge of the fluid based on the position of the gas-liquid phase boundary and an orientation of the gas-liquid phase boundary that moves.

The present specification incorporates the contents of the disclosure of Japanese Patent Application No. 2020-077259, which is the basis of the priority of the present application.

Advantageous Effects of Invention

According to the automatic analyzer, the dispenser, and the dispensing control method of the present invention, it is possible to suppress the splitting of an air layer and to obtain a high dispensing accuracy.

BRIEF DESCRIPTION OF DRAWINGS

FIGS. 3A, 3B and 3C are diagrams of gas-liquid phase boundaries in the dispenser in FIG. 2.

DESCRIPTION OF EMBODIMENTS

To begin with, first, an outline example of an automatic analyzer will be described with reference to FIG. 1. Although first to third embodiments of the present disclosure mainly target an immune analyzer, the present disclosure is applicable to a given dispenser that dispenses a fluid, and is generally applicable to automatic analyzers. The present disclosure is also applicable to, for example, a biochemical automatic analyzer, a genetic analyzer, a mass spectrometer, and a bacteria inspection apparatus. Moreover, the present disclosure is also applicable to a dispensing control method that controls the dispensing of a fluid.

Figure 1:
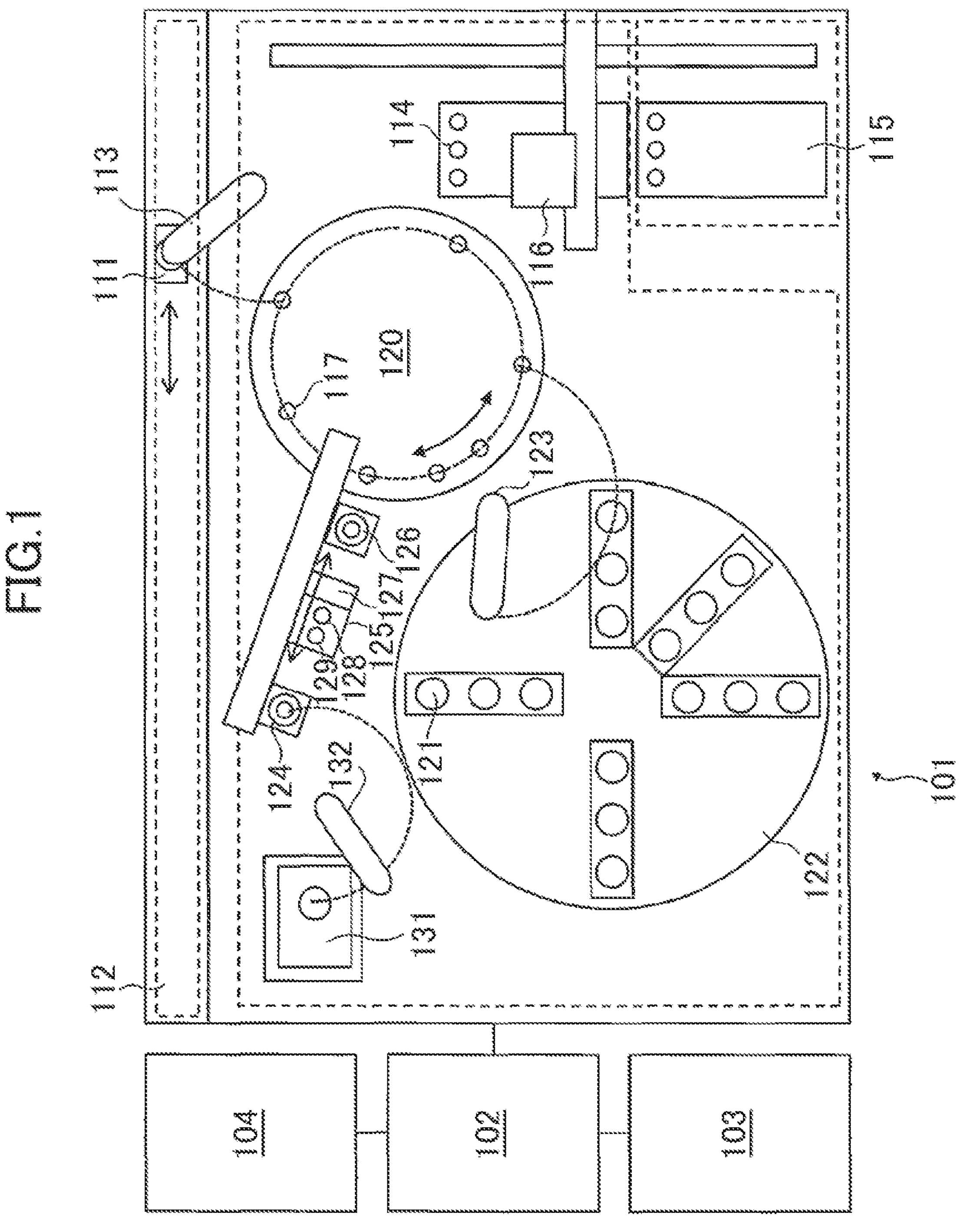
FIG. 1 is a schematic diagram of an automatic analyzer according to first to third embodiments of the present invention.

FIG. 1 is a schematic diagram of an automatic analyzer according to the first to third embodiments of the present invention. The automatic analyzer includes an analysis part 101 that performs the analysis operation, a controller 102 that controls the operation of the entire analyzer, an input unit 103 that inputs information to analyzer by a user, and a display unit 104 that displays information to the user. Note that the input unit 103 and the display unit 104 may be the same unit, and an example of these units includes a touch panel monitor.

The controller 102 may be configured using a publicly known computer. Moreover, in this case, the controller 102 may include an arithmetic unit that performs arithmetic operations and a storage unit that stores information. The arithmetic unit is a processor, for example, and the storage unit is a semiconductor memory and a magnetic disk device, for example. The controller 102 is capable of executing a dispensing control method described in the present specification.

The analysis part 101 includes components below.

A transfer mechanism 112 that transfers a sample vessel 111 containing a sample to a sample dispensing position.

A sample dispensing mechanism 113 that dispenses the sample.

A reaction vessel mounting rack 115 that mounts a reaction vessel 114.

A transfer mechanism 116 that transfers the reaction vessel 114.

A reaction vessel disk 120 that is capable of holding a liquid in the reaction vessel 114 at a constant temperature and that includes a plurality of openings 117.

A reagent disk 122 that holds a reagent vessel 121 containing a measurement reagent.

A reagent dispensing mechanism 123 that dispenses the measurement reagent into the reaction vessel 114.

A magnetic separator 124 having magnets arranged around the reaction vessel 114 (which is installed to trap magnetic particles in the reaction vessel 114 to the inner wall of the reaction vessel 114).

A stirring mechanism 126 that stirs a liquid accommodated in the reaction vessel 114 in a non-contact manner.

A transport-aspiration-discharge mechanism 125 that transfers the reaction vessel 114 among the reaction vessel disk 120, the magnetic separator 124, and the stirring mechanism 126 and that is capable of aspirating and discharging a liquid solution in the reaction vessel 114.

A detector 131 that detects components in blood.

A detector dispensing mechanism 132 that aspirates extracted components in blood in the reaction vessel 114 and that discharges the components into the detector 131.

The transport-aspiration-discharge mechanism 125 includes a grip mechanism 127, an aspiration nozzle 128, and a discharge nozzle 129.

In the following, the outline of an analysis process in the automatic analyzer will be described with reference to FIG. 1. Prior to analysis, the automatic analyzer transfers a reaction vessel 114 from the reaction vessel mounting rack 115, and installs the reaction vessel 114 in the opening 117 on the reaction vessel disk 120.

The sample dispensing mechanism 113 aspirates a sample from the sample vessel 111, and discharges the sample into the reaction vessel 114 on the reaction vessel disk 120. With the sample dispensing mechanism 113, sample dispensing from one sample vessel 111 ends.

The reagent dispensing mechanism 123 aspirates a reagent (e.g. a reagent for measurement) from the reagent vessel. 121 on the reagent disk 122, and discharges the reagent into the reaction vessel 114 on the reaction vessel disk 120.

The reaction vessel disk 120 functions as an incubator, for example, and incubates the reaction vessel 114 installed on the opening 117 for a certain period of time.

When the sample or the reagent is dispensed, a dispensing piping is filled with a push out fluid up to the tip end, first, an air layer that prevents dilution or mixing is aspirated, then the sample or the reagent is aspirated from the sample vessel 111, and a predetermined amount is discharged into the reaction vessel 114.

In the following, specific embodiments of the present invention will be described. Note that the present embodiment is also applicable to both of the sample dispensing mechanism 113 and the reagent dispensing mechanism 123. Both of the sample and the reagent are a fluid, and are a liquid in the embodiments below. In the following description, the sample and the reagent are collectively referred to as a dispensed liquid.

First Embodiment

Figure 2:
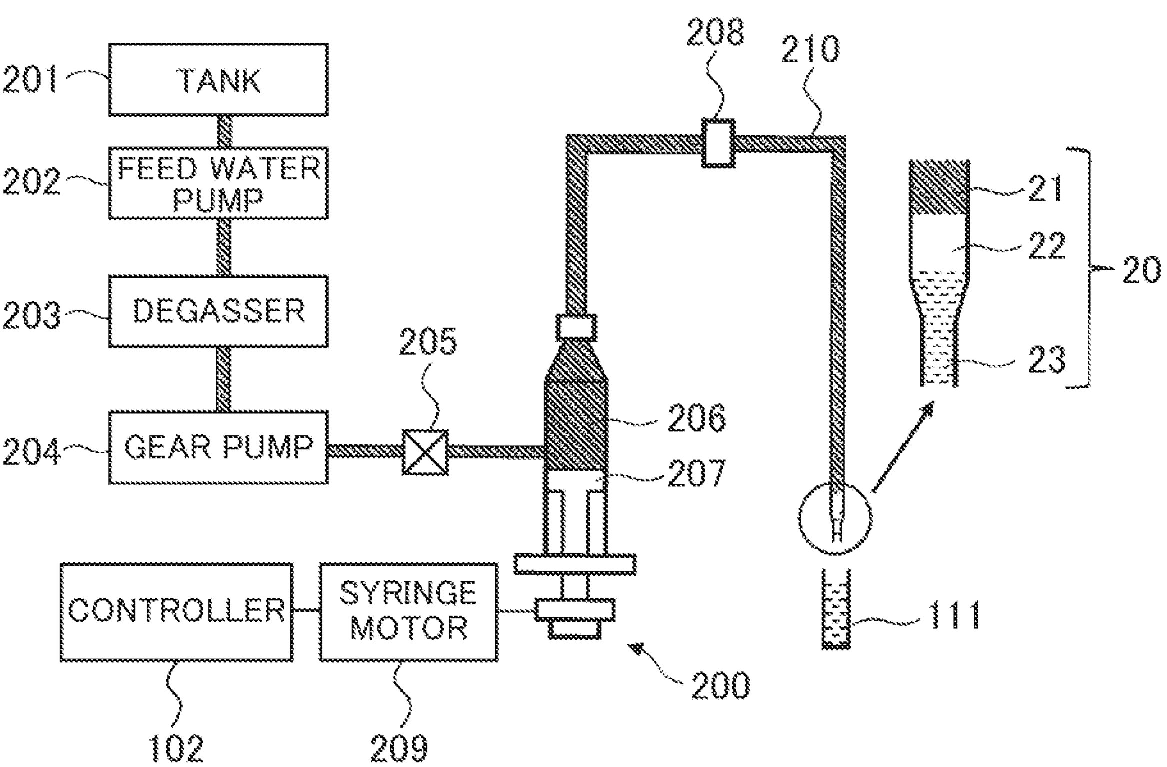
FIG. 2 is an illustration showing the configuration of a dispenser according to the first embodiment.

In the following, a first embodiment of the present invention will be described with reference to the drawings. Referring to FIG. 2, a dispensing method for a dispensed liquid according to the present invention will be described.

FIG. 2 is an illustration showing the configuration of a dispenser according to the first embodiment. The dispenser is a device that dispenses a fluid. The sample dispensing mechanism 113, the reagent dispensing mechanism 123, and the detector dispensing mechanism 132 in FIG. 1 are all examples of a dispenser.

The dispenser includes a piping 210. The piping 210 is the passage of a dispensed liquid, and its tip end is formed as a nozzle 20 that dispenses a fluid. As described above, the dispenser includes the nozzle 20.

The dispenser includes a syringe motor 209. The controller 102 controls the drive of the syringe motor 209 to control the motion of a plunger 207 of a syringe 200. For example, the amount of movement and rate of travel of the plunger 207 is adjusted. At this time, a controller 102 changes the pulse rate of a drive signal to be supplied to the syringe motor 209, and thus adjusts the rate of travel of the plunger 207.

Here, the syringe motor 209 functions as a pressure source that generates pressure fluctuations to control the flow velocity of the nozzle 20 aspirating and discharging the dispensed liquid. The piping 210 includes the nozzle 20, and is a passage connecting the nozzle 20 to the syringe motor 209. The pressure fluctuations propagate through the piping 210, and change the flow velocity of the dispensed liquid.

The controller 102 controls the operation of the nozzle 20 and the syringe motor 209. First, before moving the plunger 207, the nozzle 20 is filled with a push out fluid 21 (system water) up to its tip end. This is performed in which for example, a solenoid valve 205 is opened, and the push out fluid 21 in the tank 201 is discharged from the nozzle 20 using a feed water pump 202 and a gear pump 204. At this time, air in the push out fluid 21 is removed by passing the push out fluid 21 through a degasser 203 such that the push out fluid 21 in the piping efficiently (i.e., the attenuation of pressure propagation is small) propagates the operation of the plunger 207, described later, to the tip end of the nozzle 20. After that, the solenoid valve 205 is closed.

Subsequently, an air layer 22 is aspirated into the tip end of the nozzle 20. For example, the aspiration operation of the air layer 22 is such that the plunger 207 is moved in an aspiration direction (downward orientation in FIG. 2) in a state in which the tip end of the nozzle 20 is not inserted into the inside of a dispensed liquid 23 (as an example, a sample solution in a sample vessel 111). As a result, the capacity of the syringe chamber 206 increases, and air corresponding to this change in the capacity is aspirated.

Subsequently, the dispensed liquid is aspirated. First, the nozzle 20 is inserted into the dispensed liquid 23. At this time, the controller 102 controls the depth of insertion of the nozzle 20 based on a liquid level position. Configurations, operation, and the like for acquiring the liquid level position can be appropriately designed by a person skilled in the art based on publicly known techniques and the like. After that, the plunger 207 is moved in the aspiration direction (downward orientation in FIG. 2) to aspirate the dispensed liquid 23. The aspiration speed of the dispensed liquid 23 is determined by the rate of travel of the syringe 200.

FIG. 3 is a diagram of a gas-liquid phase boundary in the analyzer in FIG. 2. In the present embodiment, the flow velocity of the dispensed liquid 23 is controlled based on the position of the gas-liquid phase boundary and the moving direction. The gas-liquid phase boundary includes an upstream gas-liquid phase boundary formed on the upstream side of the air layer 22 in the inside of the piping 210 and a downstream gas-liquid phase boundary formed on the downstream side of the air layer 22.

Figures 3A, 3B:
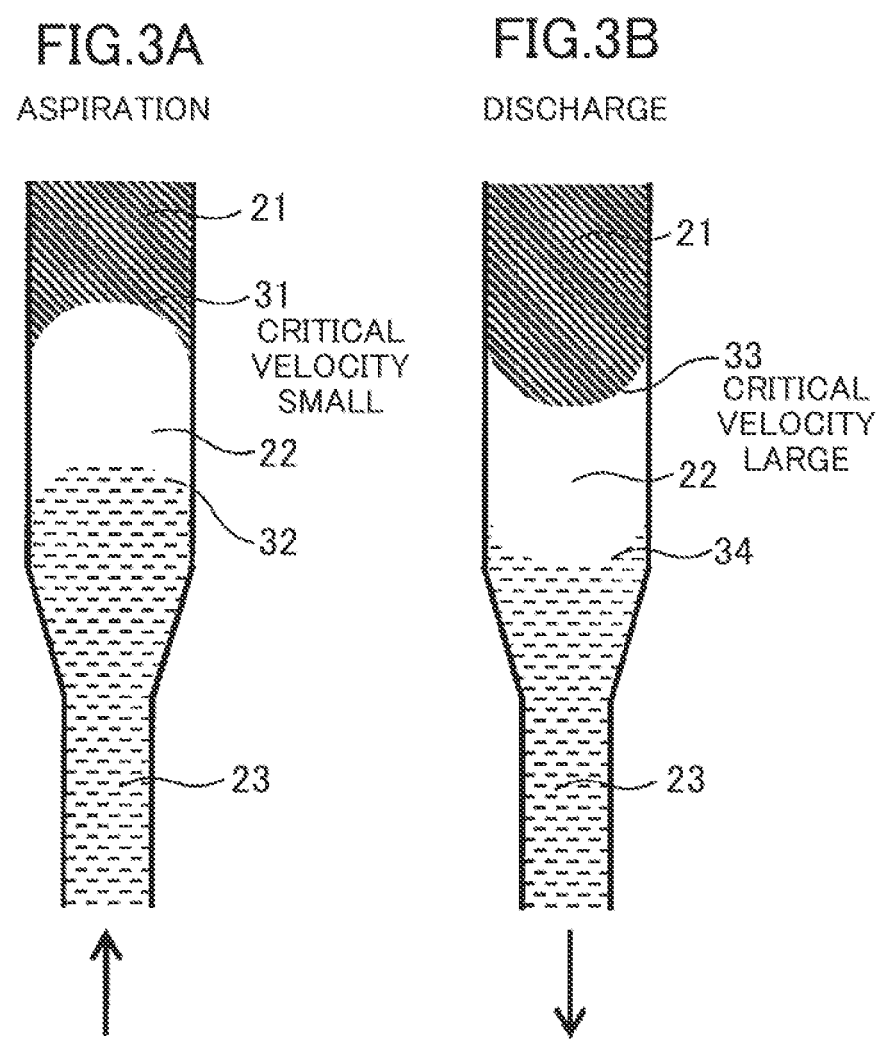

FIG. 3A shows an example at the time of aspiration. The upstream gas-liquid phase boundary is an interface 32 between the air layer 22 and the dispensed liquid 23, and the downstream gas-liquid phase boundary is an interface 31 between the push out fluid 21 and the air layer 22. FIG. 3B shows an example at the time of discharge. The upstream gas-liquid phase boundary is an interface 33 between the push out fluid 21 and the air layer 22, and the downstream gas-liquid phase boundary is an interface 34 between the air layer 22 and the dispensed liquid 23.

Figures 4A, 4B, 4C, 4D:
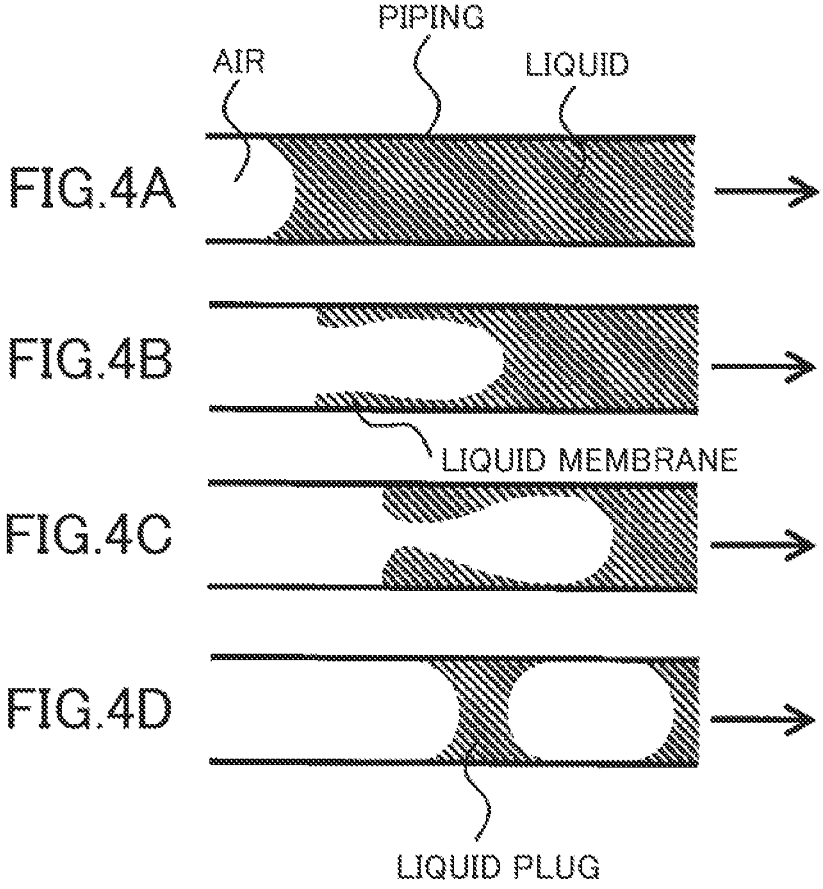
FIGS. 4A, 4B, 4C and 4D are illustrations showing the division of air in a piping.

Referring to FIG. 4, an example of a mechanism in which the air layer is split in the piping 210 will be described. The liquid and the air layer move in the orientation of arrows in FIG. 4A. When the gas-liquid phase boundary moves with this move, a liquid membrane is formed along the inner circumferential surface of the piping 210 (FIG. 4B). The liquid membrane of the inner circumferential surface is joined (FIG. 4C), and a liquid plug is formed (FIG. 4D). The liquid plug separates and splits the air layer. Although this is the description of the downstream gas-liquid phase boundary, the air layer is split by a mechanism similar to or different from this mechanism also in the upstream gas-liquid phase boundary.

The greater the rate of travel of the liquid becomes, the thicker the liquid membrane becomes, and the air layer is prone to be split. Moreover, the narrower the piping becomes, the easier the liquid membrane becomes joined, and the air layer is prone to be split. Furthermore, in the upstream gas-liquid phase boundary (the interface 32 in FIG. 3A, and the interface 33 in FIG. 3B), i.e., in the interface on the side where the liquid moves toward the air layer, the liquid projects to the air, and the air layer 22 resists split more than in the downstream gas-liquid phase boundary. Moreover, in the place where the piping the cross sectional area changes (e.g. a connector 208 that connects the nozzle 20 to a tube in the piping 210, and the like), the air layer 22 is specifically prone to be split.

In the following, the maximum flow velocity at which the air layer 22 is no split is referred to as a critical flow velocity. At a place where the air layer 22 is prone to be split, the critical flow velocity is small. Moreover, the critical flow velocity varies depending on the orientation in which the gas-liquid phase boundary moves. In the examples in FIG. 3, the critical flow velocity of the interface 31 in FIG. 3A is smaller than the critical flow velocity of the interface 33 in FIG. 3B at the same position.

Furthermore, the critical flow velocity varies depending on the properties of the fluid (the dispensed liquid 23 or the push out fluid 21). Therefore, for example, although both of the interface 31 in FIG. 3A and the interface 34 in FIG. 3B project on the liquid side, the critical flow velocities are sometimes different.

Figures 5A, 5B, 5C:
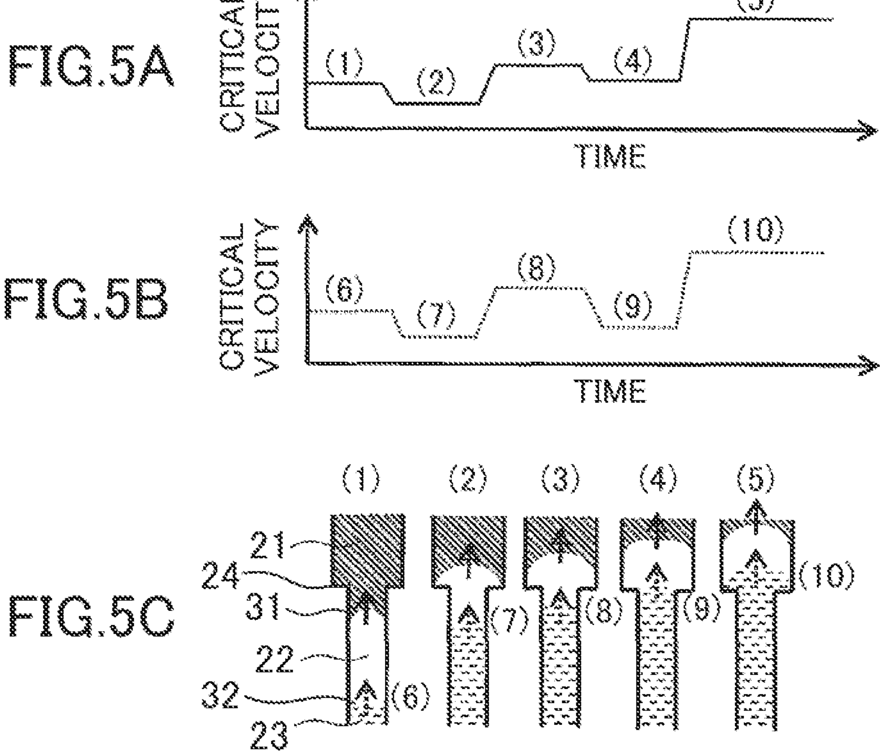
FIGS. 5A, 5B and 5C are diagrams of the relationship between a critical velocity and positions of the gas-liquid phase boundary according to the first embodiment.

FIG. 5 shows the relationship between the critical flow velocity and the position of the gas-liquid phase boundary according to the first embodiment. An example in FIG. 5 corresponds to the critical flow velocity when the dispensed liquid 23 is aspirated. FIG. 5A shows the critical flow velocity of the interface 31 to time (the downstream critical flow velocity), and FIG. 5B shows the interface 32 the critical flow velocity of (the upstream critical flow velocity) to time. FIG. 5C shows the positions of the air layer 22 in the piping 210 (e.g. around the nozzle 20) at each time.

In FIG. 5, for convenience of explanation, the shape of the nozzle is simplified (as a result, this shape is different from the shape of the nozzle 20 in FIG. 2 and the like). Although the piping 210 has a portion where the cross sectional area changes, in the present embodiment, this portion where the cross sectional area changes is formed as a step 24 in the midway point of the nozzle.

(1) and (6) in FIG. 5 represent states before the interface 31 and the interface 32 reach the step 24.

(2) and (7) in FIG. 5 represent states after the interface 31 reaches the step 24 and before the interface 31 passes the step 24. Since one of the interfaces is present at the step 24, the critical flow velocities of the interface 31 and the interface 32 are smaller than those shown in (1) and (6).

Note that in the present specification, a structure is "present at" a site means a state in which two ends of a structure having a certain length in the flowing direction of the piping 210 are located on both sides of a specific site sandwiching the specific site in the piping 210, for example. For example, although the interface 31 has a certain length in the flowing direction due to its projecting shape, in (2) in FIG. 5, its tip end (downstream side end) passes the step 24, and its rear end (upstream side end) does not pass the step 24. As described above, in (2) in FIG. 5, two ends of the interface 31 are located on both sides of the step 24, and it can be said that the interface 31 is present at the step 24.

(3) and (8) in FIG. 5 represent states after the interface 31 passes the step 24 and before the interface 32 reaches the step 24. Since both of the interfaces are not present at the step 24, the critical flow velocities of the interface 31 and the interface 32 are greater than those shown in (2) and (7). Moreover, since the cross sectional area of the interface 31 becomes large, the critical flow velocities of the interface 31 and the interface 32 are greater than those shown in (1) and (6).

(4) and (9) in FIG. 5 represent states after the interface 32 reaches the step 24 and before the interface 32 passes the step 24. Since one of the interfaces is present at the step 24, the critical flow velocities of the interface 31 and the interface 32 are smaller than those shown in (3) and (8).

(5) and (10) in FIG. 5 represent states after the interface 32 passes the step 24. Since both of the interfaces are not present at the step 24, the critical flow velocities of the interface 31 and the interface 32 are greater than those shown in (4) and (9). Moreover, both of the cross sectional areas of the interface 31 and the interface 32 become much larger, the critical flow velocities of the interface 31 and the interface 32 are greater than those shown in (3) and (8).

In two critical flow velocities shown in FIGS. 5(A) and 5(B), the low critical flow velocity is set as the upper limit, and the flow rate is controlled by the controller 102 and the syringe 200 such that the actual flow velocity is this upper limit or less.

As described above, the flow velocity of the dispensed liquid 23 is controlled based on the positions of the interfaces 31 and 32. The positions of the gas-liquid phase boundary can be calculated based on the volume of the air layer 22, the cross sectional area of the piping 210, and the volume of the dispensed liquid 23 that has been aspirated or discharged. The volume of the air layer 22 can be determined and stored in advance. The cross sectional area of the piping 210 can be measured and stored in advance. In the case in which the cross sectional area changes corresponding to the position of the piping 210, the cross sectional areas at the positions of the piping 210 are stored. The volume of the dispensed liquid 23 that has been aspirated or discharged can be acquired as the integrated value of the flow rate regarding aspiration and discharge, for example.

Note that at the time of actual control, it is unnecessary to make reference to the cross sectional area of the piping 210. For example, graphs shown in FIG. 5 may be generated in advance in consideration of the cross sectional area. However, at the time of actual control, the critical flow velocity can be acquired from the graphs without directly making reference to the cross sectional area. Of course, the cross sectional area may be dynamically made reference.

The controller 102 controls the flow velocity of the dispensed liquid 23 by controlling the operation of the syringe 200 based on the positions of the gas-liquid phase boundary. Note that the mutual conversion of the time, the flow rate, and the flow velocity can be performed based on the cross sectional area of the piping 210 and the like. Moreover, the conversion between the flow velocity of the nozzle 20 (e.g. the flow velocity at the tip end of the nozzle 20) and the flow velocity of another part in the piping 210 can be performed based on the cross sectional area of the piping 210 and the like as well.

Note that FIG. 5 is an example of the critical flow velocity when the dispensed liquid 23 is aspirated. However, the critical flow velocity when the dispensed liquid 23 is discharged can be similarly determined as well. Here, the interface at the time of aspiration (e.g. the interface 31 between the push out fluid 21 and the air layer 22 in FIG. 3A) and the corresponding interface at the time of discharge (e.g. the interface 33 between the push out fluid 21 and the air layer 22 in FIG. 3B), the critical flow velocities are different as shown in FIG. 3, even though the positions of the gas-liquid phase boundary are the same. In order to cope with this, the controller 102 can vary the critical flow velocity corresponding to the orientation in which the gas-liquid phase boundary moves. With this configuration, an appropriate flow velocity can be set depending on the situations.

The critical flow velocity may be controlled suitable for the type of the dispensed liquid 23. For example, the controller 102 may acquire identification information indicating the type of the dispensed liquid 23, and may control the flow velocity corresponding to this identification information. The identification information can be appropriately input to the controller 102 by the user of the dispenser, for example. Moreover, the controller 102 may store in advance the relationship between the identification information and the flow velocity. With this configuration, control can be changed regarding a sample in which the air layer 22 is prone to be split and the like and a sample in which the air layer 22 is not prone to be split.

The flow velocity is controlled so as not to split the air layer 22 with the configuration and the method shown in the present embodiment, and thus it is possible to obtain high dispensing accuracy.

The flow velocity is controlled based on the positions of the interfaces 31 to 34, the cross sectional area of the piping 210, and the orientation in which the interfaces 31 to 34 move, and thus it is possible to perform an efficient dispensing operation while suppressing the splitting of the air layer 22. Specifically, in the present embodiment, the upstream critical flow velocity and the downstream critical flow velocity are individually defined and a smaller one is used in priority, and thus it is possible to perform more accurate control. . . .

In the first embodiment (FIG. 5), the critical flow velocity continuously changes. However, the critical flow velocity may discontinuously change. For example, when the critical flow velocity in (1) changes to the critical flow velocity in (2) shown in FIG. 5(A), the critical flow velocity may be instantaneously switched. Moreover, the critical flow velocity may be changed in a curved manner.

Furthermore, in the first embodiment, control based on two critical flow velocities shown in FIGS. 5(A) and 5(B) is performed. However, control may be performed based on any one of the two critical flow velocities. For example, at the time of aspiration, control may be performed based only on the interface 31, and at the time of discharge, control may be performed based only on the interface 33.

Second Embodiment

In a second embodiment, the contents of control by the controller 102 are partially changed in the first embodiment. In the following, differences from the first embodiment will be described. The present embodiment is suited to the case in which fine adjustment of the flow velocity is difficult such as a small amount of an air layer 22.

As shown in FIG. 3, the interfaces 31 to 34 are defined by the air layer 22. In other words, the air layer 22 has a gas-liquid phase boundary each on the upstream side and the downstream side. In the second embodiment, the flow velocity of a dispensed liquid 23 is controlled based on whether the air layer 22 is present at a step 24.

Figures 6A, 6B:
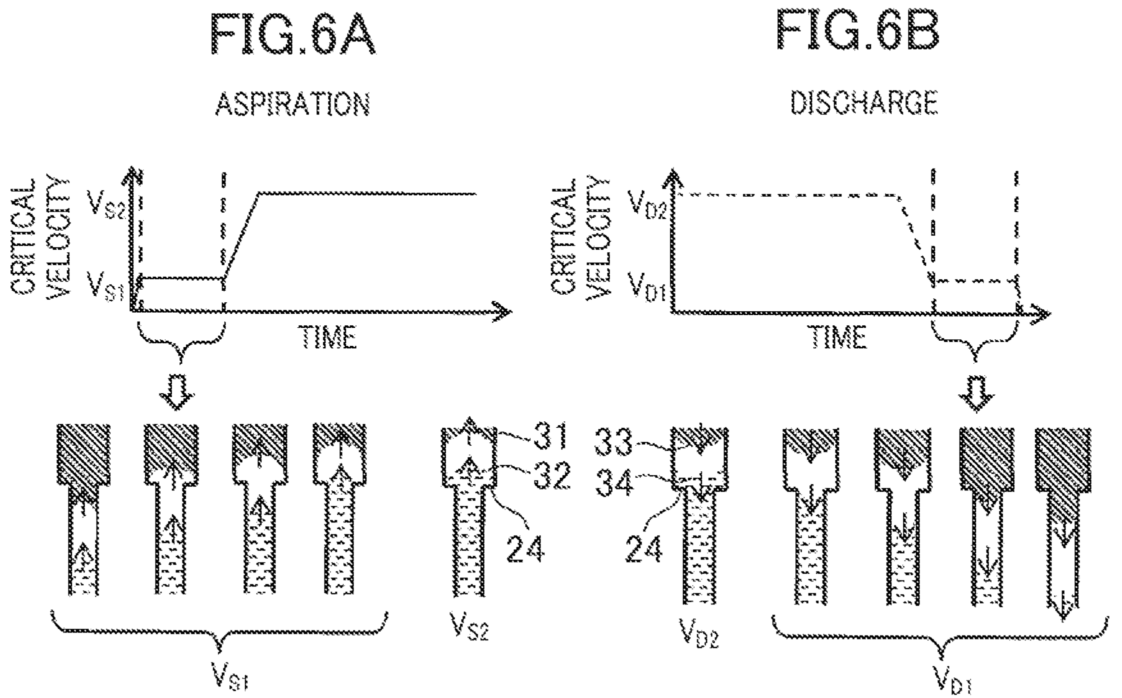
FIGS. 6A and 6B are diagrams of the relationship between a critical velocity and positions of the gas-liquid phase boundary according to the second embodiment.

FIG. 6 shows the relationship between the critical flow velocity and the position of the gas-liquid phase boundary according to the second embodiment. In the second embodiment, for simplifying the operation of a syringe 200, the number of times of switching the flow velocity s is reduced. FIG. 6A shows the critical flow velocity to time at the time of aspiration, and FIG. 6B shows the critical flow velocity to time at the time of discharge.

As shown in FIG. 6A, at the time of aspiration, during which the air layer 22 is present at the step 24, the critical flow velocity is controlled to $V_{S1}$, after that (i.e., after the air layer 22 passes the step 24), the critical flow velocity is controlled to $V_{S2}$, where $V_{S2}>V_{S1}$.

Note that in the example in FIG. 6A, the critical flow velocity before the air layer 22 is present at the step 24 is also $V_{S1}$. However, the critical flow velocity at this point in time may be set to a value exceeding $V_{S1}$. Note that preferably, the critical flow velocity at this point in time is set to less than $V_{S2}$.

Similarly, as shown in FIG. 6B, at the time of discharge, before the air layer 22 is present at the step 24, control is performed such that the critical flow velocity is set to $V_{D2}$, and during which the air layer 22 is present at the step 24, control is performed such that the critical flow velocity is set to $V_{D1}$, where $V_{D2}>V_{D1}$.

Note that in the example in FIG. 6B, the critical flow velocity after the air layer 22 passes the step 24 is also V el. However, the critical flow velocity at this point in time may be set to a value exceeding $V_{D1}$. Note that preferably the critical flow velocity at this point in time is set to less than $V_{D2}$.

According to the present embodiment, in the case in which it is difficult to accurately predict the position of the air layer 22, for example, it is possible to suppress the splitting of the air layer 22 by a simpler flow velocity control than in the first embodiment, and thus it is possible to obtain high dispensing accuracy.

Third Embodiment

In a third embodiment, the contents of control by the controller 102 are partially changed in the first embodiment. In the following, differences from the first embodiment will be described.

Figure 7A:
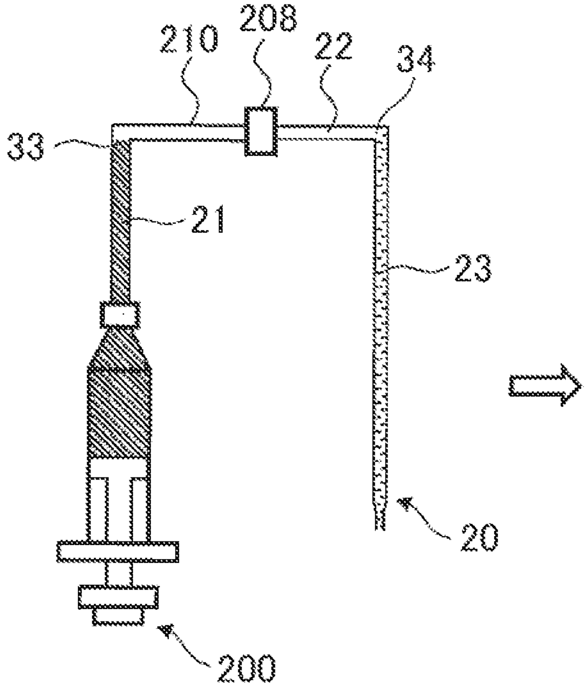
FIGS. 7A and 7B are illustrations showing the configuration of a dispenser according to a third embodiment.
Figure 7B:
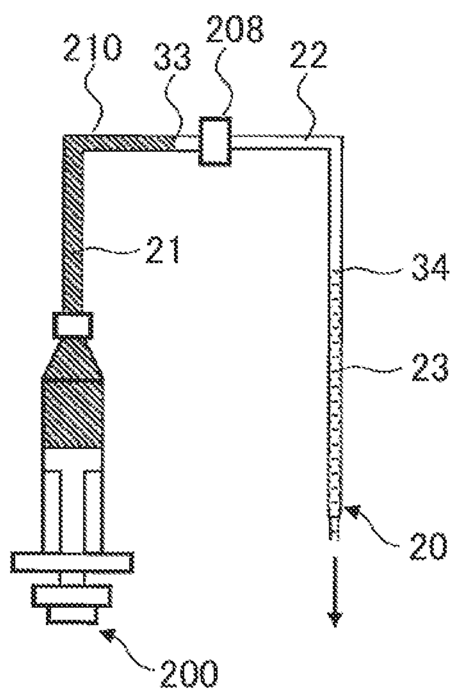

FIG. 7 shows the configuration of a dispenser according to the third embodiment. FIG. 7A shows the position of an air layer 22 before discharge, and FIG. 7B shows the position of the air layer 22 after discharge. In the present embodiment, a portion where the cross sectional area of a piping 210 changes is a connector 208.

In order to suppress the splitting of the air layer 22 at the time of the discharge operation, a controller 102 controls an interface 33 and an interface 34 so as not to pass the connector 208. Such control is feasible through the aspiration amount and discharge amount of a dispensed liquid 23 and the aspiration amount of the air layer 22.

Note that FIG. 7 is an example of the operation when the dispensed liquid 23 is discharged. The operation when the dispensed liquid 23 is aspirated can be similarly controlled such that an interface 31 and an interface 32 do not pass the connector 208.

According to the present embodiment, since the gas-liquid phase boundary does not pass the connector 208, the air layer 22 is not prone to be split, and it is possible to obtain high dispensing accuracy.

Note that in the present embodiment, the flow velocity at the time of aspiration and discharge can be made constant, and control of the flow velocity is unnecessary. However, the flow rate or the flow velocity may be controlled corresponding to the cross sectional area of the piping 210 and the like, similarly to the first embodiment or second embodiment.

Figure 8:
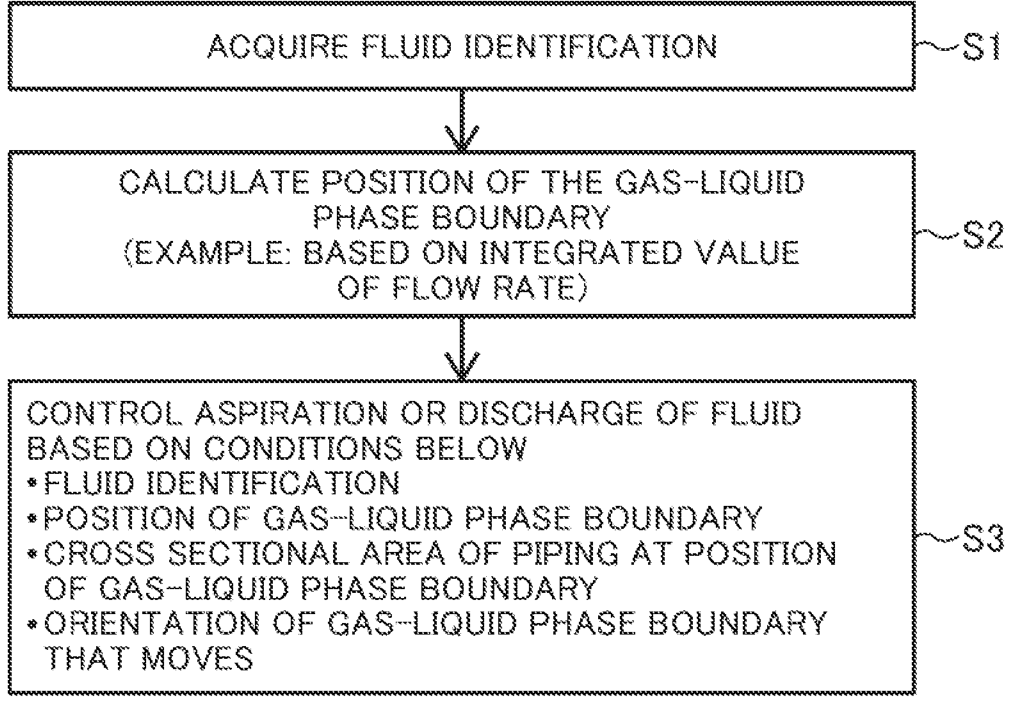
FIG. 8 is a flowchart showing a dispensing control method according to the frats to the third embodiments.

FIG. 8 is a flowchart showing an example of a dispensing control method according to the first to the third embodiment.

First, the controller 102 acquires identification information indicating the type of the dispensed liquid 23 (Step S1). Subsequently, the controller 102 calculates the position of the gas-liquid phase boundary in the piping 210 (the interfaces 31 to 34) (Step S2). The controller 102 calculates the position of the gas-liquid phase boundary based on the integrated value of the flow rate of the dispensed liquid 23, for example.

The controller 102 then controls the aspiration or discharge of the dispensed liquid 23 (Step S3). The specific contents of this control are as described in the embodiments, and control is performed based on the identification information, the position of the gas-liquid phase boundary, the cross sectional area of the piping 210 at the position of the gas-liquid phase boundary, the orientation in which the gas-liquid phase boundary moves, and the like.

Specifically, in the first embodiment, in Step S3, the controller 102 determines the upstream critical flow velocity based on the upstream position of the gas-liquid phase boundary, and determines the downstream critical flow velocity based on the downstream position of the gas-liquid phase boundary. The actual flow velocity is controlled based on the smaller one of the upstream critical flow velocity and the downstream critical flow velocity.

In the second embodiment, in Step S3, the controller 102 controls the flow velocity based on whether the air layer 22 is present at the step 24 of the piping 210.

In the third embodiment, in Step S3, the controller 102 controls the aspiration or discharge of the dispensed liquid 23 such that the gas-liquid phase boundary does not pass the connector 208.

REFERENCE SIGNS LIST

- 20: nozzle,
- 21: push out fluid,
- 22: air layer,
- 23: dispensed liquid (fluid),
- 24: step (part where a cross sectional area is changed),
- 31: interface (downstream gas-liquid phase boundary),
- 32: interface (upstream gas-liquid phase boundary),
- 33: interface (upstream gas-liquid phase boundary),
- 34: interface (downstream gas-liquid phase boundary),

101: analysis part,
102: controller,
103: input unit,
104: display unit,
111: sample vessel,
112: transfer mechanism,
113: sample dispensing mechanism (dispenser),
114: reaction vessel,
115: reaction vessel mounting rack,
116: transfer mechanism,
117: above-described opening,
120: reaction vessel disk,
121: reagent vessel,
122: reagent the disk,
123: reagent dispensing mechanism (dispenser),
124: magnetic separator,
125: transport-aspiration-discharge mechanism,
126: stirring mechanism,
127: grip mechanism,
128: aspiration nozzle,
129: discharge nozzle,
131: detector,
132: detector dispensing mechanism (dispenser),
200: syringe,
201: tank,
202: feed water pump,
203: degasser,
204: gear pump,
205: solenoid valve,
206: syringe chamber,
207: plunger,
208: connector (part where the cross sectional area is changed),
209: syringe motor (pressure source),
210: piping (passage)

The invention claimed is:

1. An automatic analyzer for suppressing splitting of an air layer in a passage and improving dispensing accuracy, the automatic analyzer comprising:

an analysis part configured to perform analysis; and a dispenser configured to suppress splitting of an air layer in a passage and improving dispensing accuracy during either aspiration or discharge of fluid in the automatic analyzer, wherein the dispenser includes;

a nozzle configured to dispense a fluid;

a pressure source configured to generate a pressure fluctuation that controls a flow velocity of aspiration or discharge of the fluid in the nozzle;

the passage having a cross-section, the passage configured to connect the nozzle to the pressure source, wherein the passage includes a position where the cross section changes; and a controller that controls operations of the nozzle and the pressure source, wherein the controller is configured to, during at least one of aspiration or discharge of the fluid:

wherein the controller is configured to:

set the flow velocity of the fluid during aspiration or discharge to be substantially constant;

calculate a position of the gas-liquid phase boundary in the passage based on a volume of the air layer aspired in the passage, the cross sectional area of the passage including where the cross section changes, and an integrated value of a flow rate of the liquid that has been aspirated or discharged fluid; and control, during either the aspiration of the fluid into the nozzle or discharge of the liquid fluid from the nozzle, the aspiration amount of the air layer and the aspiration amount or discharge amount of the fluid the such the gas-liquid phase boundary of the air layer does not pass the position in the passage where the cross sectional area changes to suppress splitting of the air layer, calculate a position of a gas-liquid phase boundary in the passage based on a volume of an air layer aspired in the passage, a cross sectional area of the passage, and an integrated value of a flow rate of the fluid, and control the flow velocity based on the position of the gas-liquid phase boundary and an orientation of the gas-liquid phase boundary that moves such that, during either aspiration or discharge, the flow velocity is at or below a critical flow velocity which is a maximum flow velocity at which a splitting of the air layer is suppressed.

2. The automatic analyzer according to claim 1, wherein the controller is further configured to:

acquire identification that expresses a type of the fluid; and control the flow velocity further based on the identification.

3. The automatic analyzer according to claim 2, wherein the controller stores, in the memory, a plurality of critical flow velocity profiles respectively associated with a plurality of fluid types expressed by the identification, each critical flow velocity profile defining the critical flow velocity as a function of the position of the gas-liquid phase boundary and the orientation of the gas-liquid phase boundary that moves, and wherein the controller selects one of the plurality of critical flow velocity profiles based on the identification and controls the flow velocity using the selected critical flow velocity profile.

4. The automatic analyzer according to claim 1, wherein the controller is further configured to:

control the flow velocity further based on the cross sectional area of the passage at the position of the gas-liquid phase boundary.

5. The automatic analyzer according to claim 1, wherein: the gas-liquid phase boundary includes an upstream gas-liquid phase boundary and a downstream gas-liquid phase boundary;

wherein the controller is further configured to:

determine an upstream critical velocity based on an upstream position of the gas-liquid phase boundary;

determine a downstream critical velocity based on a downstream position of the gas-liquid phase boundary; and control the flow velocity further, using, as the critical flow velocity, a smaller velocity between the upstream critical velocity and the downstream critical velocity.

6. The automatic analyzer according to claim 5, wherein the controller is further configured to:

determine, for a same position of the gas-liquid phase boundary in the passage, a first critical flow velocity used when the gas-liquid phase boundary moves in an aspiration direction and a second critical flow velocity used when the gas-liquid phase boundary moves in a discharge direction, the first critical flow velocity being different from the second critical flow velocity, and control the flow velocity based on the first critical flow velocity when the gas-liquid phase boundary moves in the aspiration direction and based on the second critical flow velocity when the gas-liquid phase boundary moves in the discharge direction.

7. The automatic analyzer according to claim 1, wherein:

the gas-liquid phase boundary includes an upstream gas-liquid phase boundary and a downstream gas-liquid phase boundary;

the upstream gas-liquid phase boundary and the downstream gas-liquid phase boundary are defined by the air layer; and the controller is further configured to control the flow velocity further based on whether the air layer is present at the portion where the cross sectional area changes is changed in the passage.

8. The automatic analyzer according to claim 1, wherein the controller stores, in a memory, a correspondence between the position of the gas-liquid phase boundary in the passage and the critical flow velocity for the orientation in which the gas-liquid phase boundary moves, and wherein the controller controls the flow velocity by reading, from the memory, the critical flow velocity corresponding to the calculated position of the gas-liquid phase boundary and the orientation of the gas-liquid phase boundary that moves.

9. A dispensing control method for a controlling a dispenser in an automatic analyzer, the dispenser having a nozzle configured to dispense a fluid, a passage having a cross-section, including a position where the cross-section changes, a pressures source configured to generate a fluctuations that controls a flow velocity of the fluid in the dispenser, the method comprising:

aspirating and dispensing a fluid containing a liquid and the air layer through the nozzle of the dispenser, wherein the air layer includes a gas-liquid phase boundary;

setting the flow velocity of the fluid during aspiration or discharge to be substantially constant;

calculating a position of the gas-liquid phase boundary in the passage of the dispenser based on a volume of the air layer aspired in the passage, the cross sectional area of the passage including a portion where the cross section changes, and an integrated value of a flow rate of the liquid that has been aspirated or discharged; and controlling, during either the aspiration of the liquid into the nozzle or discharge of the liquid from the nozzle, an aspiration amount of the air layer and an aspiration amount or discharge amount of the fluid such that the gas-liquid phase boundary of the air layer does not pass the position in the passage where the cross sectional area of the passage changes to suppress splitting of the air layer.

10. A dispenser for use in an automatic analyzer for suppressing splitting of an air layer in a passage while allowing a flow velocity of the fluid to be set independently of a critical flow velocity at a position where a cross sectional area of the passage is changed, the automatic analyzer dispenser comprising:

a nozzle configured to aspirate and dispense a fluid containing a liquid and the air layer, wherein the air layer includes a gas-liquid phase boundary;

a pressure source configured to generate a pressure fluctuation that controls a flow velocity of aspiration or discharge of the fluid in the nozzle;

a passage having a cross-section, the passage configured to connect the nozzle to the pressure source, wherein the passage includes a position where the cross section changes, and a controller that controls operations of the nozzle and the pressure source, wherein the controller is configured to:

set the flow velocity of the fluid during aspiration or discharge to be substantially constant;

calculate a position of the gas-liquid phase boundary in the passage based on a volume of the air layer aspired in the passage, the cross sectional area of the passage including where the cross section changes, and an integrated value of a flow rate of the liquid that has been aspirated or discharged fluid; and control, during either the aspiration of the fluid into the nozzle or discharge of the liquid fluid from the nozzle, the aspiration amount of the air layer and an aspiration amount or discharge amount of the fluid the such the gas-liquid phase boundary of the air layer does not pass the position in the passage where the cross sectional area of the passage is changed changes to suppress splitting of the air layer.

* * * * *